US009304498B2

(12) United States Patent
Zhou

(10) Patent No.: US 9,304,498 B2
(45) Date of Patent: Apr. 5, 2016

(54) METHOD FOR COMPENSATING TIMING ERRORS OF REAL-TIME CLOCKS

(71) Applicant: SI-EN TECHNOLOGY LIMITED, Xiamen (CN)

(72) Inventor: Dongshi Zhou, Xiamen (CN)

(73) Assignee: SI-EN TECHNOLOGY LIMITED, Xiamen, Fujian (CN)

( * ) Notice: Subject to any disclaimer, the term of this patent is extended or adjusted under 35 U.S.C. 154(b) by 129 days.

(21) Appl. No.: 14/291,123

(22) Filed: May 30, 2014

(65) Prior Publication Data

US 2015/0124918 A1 May 7, 2015

(30) Foreign Application Priority Data

Nov. 4, 2013 (CN) .......................... 2013 1 0536937

(51) Int. Cl.
*G06F 11/00* (2006.01)
*G06F 1/00* (2006.01)
*G04G 3/04* (2006.01)

(52) U.S. Cl.
CPC ........................................ *G04G 3/04* (2013.01)

(58) Field of Classification Search
CPC ......................................................... G06F 1/10
USPC .......................................................... 713/503
See application file for complete search history.

(56) References Cited

U.S. PATENT DOCUMENTS

| | | | | |
|---|---|---|---|---|
| 6,304,517 | B1 * | 10/2001 | Ledfelt et al. | 368/10 |
| 6,961,287 | B2 * | 11/2005 | Jung | 368/155 |
| 7,084,810 | B2 * | 8/2006 | Kitatani | 342/357.62 |
| 7,791,418 | B2 * | 9/2010 | Gros | 331/44 |
| 8,391,105 | B2 * | 3/2013 | Raymond | 368/46 |
| 8,767,901 | B2 * | 7/2014 | Yang | 375/371 |
| 2011/0022864 | A1 * | 1/2011 | Haiplik et al. | 713/322 |
| 2012/0166121 | A1 * | 6/2012 | Yang et al. | 702/79 |

FOREIGN PATENT DOCUMENTS

| | | | |
|---|---|---|---|
| JP | 2002365383 A | * | 12/2002 |
| JP | 2003240882 A | * | 8/2003 |

* cited by examiner

*Primary Examiner* — Suresh Suryawanshi

(57) ABSTRACT

The present invention relates to a method for compensating timing errors of real-time clocks, which comprises a compensating step, wherein in step 1, assign CNT to be 0 and execute step two; in step 2, assign FLAG to be 1 when a rising edge of 1 Hz clock is arrived and execute step 3; in step 3, judge FLAG and M3, if FLAG=1 and M3<0, execute step 4 while waiting until CNT=S4; if FLAG=1, CNT=0 and M3>0, execute step 5; otherwise execute step 2; in step 4, execute an assignment operation, CNT=0, M3=M3+S4, FLAG=0 and restart step 2; in step 5, execute an assignment operation, CNT=S4, M3=M3−S4, FLAG=0, and restart step 2. A sampling frequency of relative errors ERR of the present invention is adjustable, and a compensatory accuracy is much higher.

1 Claim, 5 Drawing Sheets

| Comparison Table | |
|---|---|
| ERR(PPM) | Compensatory Clock Numbers |
| 3 | 1 |
| 6 | 2 |
| 9 | 3 |
| ... | ... |
| N | N/3 |

METHOD FOR COMPENSATING TIMING ERRORS OF REAL-TIME CLOCKS

BACKGROUND OF THE INVENTION

1. Field of the Invention

The present invention relates a method for compensating timing errors of real-time clocks.

2. Description of the Related Art

As shown in FIG. 1, a minimum unit of real-rime clocks is "second", which principle is to divide a 32768 Hz square wave, which is an output frequency of a crystal oscillator, into 1 Hz square waves. The 1 Hz square waves generate the unit of time "second" and calendar logic circuits. Accordingly, calendar logics of minute, hour, day, month, and week are generated. The output standard frequency of the crystal oscillator is 32768 Hz; however, errors of the output frequency of the crystal oscillator always exist due to the changes of temperature and manufacturing errors of the quartz crystals.

Generally, the output frequency of the crystal oscillator is compared with the relative errors of the standard frequency 32768 Hz for deriving an error measuring standard, as the expression shown, the unit is PPM (Parts Per Million).

$$ERR = \frac{f - 32768}{32768} * 10^6 PPM$$

In present technology, the errors between the output frequency of the crystal oscillator and the standard frequency 32768 Hz are usually compensated by means of making compensations on the relative errors at regular times. According to the regular times, for example, find out the clock numbers of compensation that need to be compensated in accordance with the relative errors (ERR) and change the value of the frequency dividing counter (CNT) in every 10 seconds. As shown in FIG. 2, while the compensation is executed at every 10 seconds, 10 seconds, which means the total numbers of the frequency dividing counter and the clock numbers of reference frequency to be 32768*10=327680. Therefore, the 10-seconds frequency dividing counter CNT adding 1 is equal to a compensation of +3 PPM to the reference frequency. The frequency dividing counter CNT which fails to add one time is equal to a compensation of −3 PPM to the reference frequency. In general, the sampling frequency of ERR is 0.1 Hz, the ERR effective value of compensatory data is 3 PPM, the maximum errors after the compensation is 1.5 PPM.

The low of the sampling frequency of ERR derived by the compensatory method at regular times is, the high the effective value of the compensatory data is. However, the low sampling frequency causes aliasing errors of frequency spectrum. As a result, the sampling frequency of ERR attained by the method aforementioned cannot be too high and low. A contradictory relationship exists between the sampling frequency apparatus of ERR and the last compensatory accuracy.

SUMMARY OF THE INVENTION

The purpose of the present invention is to provide a method for compensating timing errors of real-time clocks with characteristics of an adjustable sampling frequency of relative error ERR and a higher compensatory accuracy.

To achieve the purpose abovementioned, the solution of the present invention comprises a calculating step and a compensating step:

wherein the calculating steps comprising:

step 1, subject a cyclic subtraction register M2 to an assignment operation, a cyclic subtraction register M1=the cyclic subtraction register $$M2 = \frac{10^6 * S1 * S2}{S3};$$

a periodic number of accumulative errors register M3 is assigned to be 0, wherein the S1 is used to adjust an ERR effective value, the S2 is used to adjust an operating frequency of compensatory circuits, and the S3 is used to adjust a calculation of times, then execute step 2;

step 2, make a compensatory flag register COM assigned to be 0 when a rising edge of a $$\frac{32768}{S2}$$

Hz clock is arrived, the M2 is executed by a subtraction, M2=M1−|ERR*S1|, M1=M2, then execute step 3;

step 3, judge the M2, if M2<0, an assignment to M2 is executed, $$M2 = M1 + \frac{10^6 * S1 * S2}{S3},$$

M1=M2, and the compensatory flag register COM is assigned to be 1, then execute step 4; otherwise, execute the step 2; and step 4, judge ERR*S1, if ERR*S1>0, execute $$M3 = M3 + \frac{S2}{S3};$$

otherwise, execute $$M3 = M3 - \frac{S2}{S3}$$

and execute said step 2; and wherein the compensating step comprising:

step 1, make a frequency dividing counter CNT assigned to be 0, then execute step 2;

step 2, make a compensatory flag register FLAG assigned to be 1 when a rising edge of a 1 Hz clock is arrived, then execute step 3;

step 3, judge the FLAG and the M3, if FLAG=1 and M3<0, execute step 4 while waiting until CNT=S4; if FLAG=1, CNT=0, and M3>0, execute step 5; otherwise, execute said step 2;

step 4, execute an assignment operation, CNT=0, M3=M3+S4, FLAG=0, and restart the step 2, wherein the S4 is a maximum compensatory periodic number in 1 second; and step 5, execute an assignment operation, CNT=S4, M3=M3-S4, FLAG=0, and restart the step two.

DETAILED DESCRIPTION OF THE PREFERRED EMBODIMENTS

The present invention is illustrated in detail with embodiments.

A basic relationship of the standard frequency (32768 Hz) and the actual frequency (32768*(1−ERRppm) can be obtained according to the basic definition of the relative error ERR, $$ERR = \frac{f - 32768}{32768} * 10^6 PPM.$$

Figure 1:
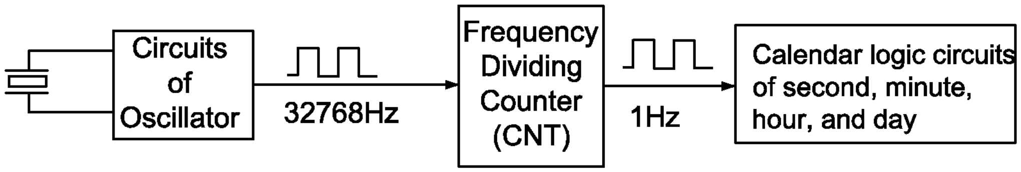
F I G. 1 Prior Art
FIG. 1 is a schematic view showing a principle of real-time clocks.
Figure 2:
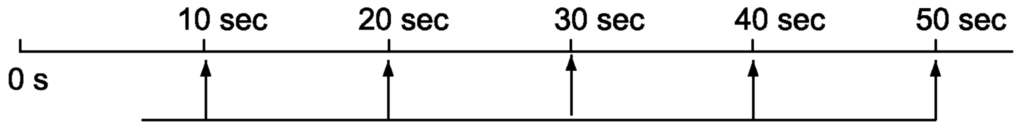
F I G. 2 Prior Art
FIG. 2 is a schematic view showing a compensatory method being executed at regular times in present technology.
Figure 3:
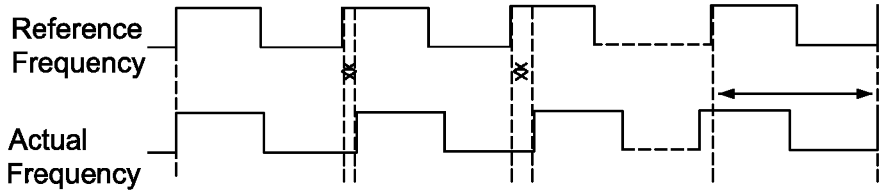
FIG. 3 is a schematic view showing a basic relationship between a standard frequency and an actual frequency.

The relationship between the standard period and the actual period can be calculated by the basic relationship of the standard frequency (32768 Hz) and the actual frequency (32768*(1−ERRppm). As shown in FIG. 3, the difference between the abovementioned frequencies is $1*ERR/10^6$ periods after passing 1 period, is $2*ERR/10^6$ periods after passing 2 periods, and is $(10^6/ERR)*ERR/10^6=1$ periods after passing $10^6/ERR$ periods. Accordingly, after passing N periods, the relationship of the standard frequency and the actual frequency is different from each other by W periodic numbers, as shown in Table 1:

TABLE 1

| N | W |
|---|---|
| $\frac{10^6}{ERR}$ | 1 |

That is, the N: W=$10^6$/ERR: 1, which needs to be compensated 1 period after passing $10^6$/ERR periods. In the actual compensatory operation, $10^6$/ERR periods are usually converted into a cyclic subtraction, and 1 period is compensated when the value of $10^6$/ERR periods is subtracted to 0 or a negative number. Because the calculating times of the $10^6$ is much bigger and the relative error ERR is smaller, accordingly, the value of the cyclic subtraction becomes big, which causes big power dissipation of the circuits. The value of the relative error ERR is smaller, for instance, 1.001, which has a decimal point cannot be calculated by the digital circuits. Only ERR=1 can be subjected the calculation, and the value 0.001 cannot be calculated, accordingly, the compensatory accuracy is affected. Therefore, the relationship of the numbers of the N and the W is converted into a Table 2 as below:

TABLE 2

| N | W |
|---|---|
| $\frac{10^6 \times S1}{ERR \times S1} \times S2 \div S3$ | 1 × S2 ÷ S3 |

wherein the meanings of the S1, S2, and s3 shown as Table 3 represents:

TABLE 3

| parameter | controlling value |
|---|---|
| S1 | ERR effective value |
| S2 | compensatory circuit operating frequency |
| S3 | Calculation of times |

The function of the S1 is to raise the compensatory accuracy. The compensatory accuracy is raised as a multiple of the S1, the S1 is a positive integer, for instance, 1, 2, 3 and N. However, if ERR=1.001, of which value 0.001 cannot be calculated by the digital circuits, consequently, only ERR=1 can be calculated, and the value of 0.001 cannot be calculated. In $$\frac{10^6 \times S1}{ERR \times S1},$$

while S1 is 1000, ERR×S1=1001. As a result, the value of 1001 can be calculated by the digital circuits, and the compensatory accuracy is raised 1000 times.

Table 4, interpretations on the examples of the parameter S1:

| N | W | compensating accuracy |
|---|---|---|
| $\frac{10^6 \times 1000}{ERR \times 1000} = \frac{10^9}{ERR'}$ | 1 | $\frac{1\ ppm}{1000} = 0.001\ ppm$ |
| $\frac{10^6 \times S1}{ERR \times S1} = \frac{10^6 \times S1}{ERR'}$ | 1 | $\frac{1\ ppm}{S1}$ |

In the expression $$\frac{10^6 \times S1}{ERR \times S1},$$

the S1 can be used to adjust the compensatory accuracy. As shown in Table 4, the parameters are set to be S1=1000, S2=1 and S3=1, and the compensatory accuracy is accordingly raised 1000 times.

In accordance with Table 4, 1 period will be compensated after passing $$\frac{10^9}{ERR'}$$

reference frequency periods. The unit of ERR is PPM, and the unit of ERR' is PPM/1000=0.001 PPM. The unit of the ERR' is 0.001 PPM, so the compensatory data ERR' is accurate and makes the compensatory accuracy to be 0.001 PPM. The merit of the S1 which is adjustable is: the compensatory accuracy can be raised. The taking range of the value of the S1 to be: the S1 is a positive integer, for example, 1, 2, 3 and . . . N.

The S2 is used to adjusting the operating frequency of compensatory circuits for lowering the power dissipation of the circuits, Table 5 shows the interpretations on the examples of parameter S2:

Table 5, interpretations on the parameter S2:

| N | W | operating frequency of compensatory circuits |
|---|---|---|
| $\frac{10^6}{\mathrm{ERR}}\times 8$ | 1 × 8 | $\frac{1}{8}f$ |
| $\frac{10^6}{\mathrm{ERR}}\times \mathrm{S2}$ | 1 × S2 | $\frac{1}{\mathrm{S2}}f$ |

The S2 can adjust the operating frequency of compensatory circuits. The expression $$\frac{10^6}{ERR}$$

is conducted by a division. In the actual execution of the circuits, the division is converted into a subtraction to execute the calculation for diminishing the area of the chips and saving the manufacturing cost. The period of the cyclic subtraction is S2×T, the T is the reference frequency period, the minued of the cyclic subtraction is the difference derived from the last subtraction, and the subtrahend is ERR. The initial value of the minued is $10^6$, the time have passed $$\frac{10^6}{ERR}\times S2\times T$$

periods when the difference is a negative number, and one cycle of compensatory calculation is finished, S2×T are needed to be compensated.

For instance, regarding Table 5, S1=1, S2=8, S3=1, the compensatory circuits are executed the cyclic subtraction of which period is 8 T. In other words, the operating frequency of compensatory circuits is $$\frac{1}{8}f,$$

the f is the reference frequency. Therefore, the operating frequency of compensatory circuits is lowered, and the power dissipation of the circuits is accordingly decreased. The taking range of the value of the S2 is: the S2 is a positive integer, for example, 1, 2, 3, . . . and N.

The function of the S3 is to adjust the calculating times of one compensatory cycle for minimize the minued and the calculating numbers calculated by the subtractor. Therefore, the area of the compensatory calculating circuits is decreased, and the manufacturing cost is saved. Table 6 shows the interpretations on the example of the parameter S3:

Table 6, the interpretations on the parameter S3:

| N | W | The initial value of the minued |
|---|---|---|
| $\frac{10^6\times 1}{\mathrm{ERR}\times 1}\times 16\div 16=\frac{62500}{\mathrm{ERR}}\times 16$ | 1 × 16 ÷ 16 = 1 | $10^6$ × 1 ÷ 16 = 62500 |
| $\frac{10^6\times \mathrm{S1}}{\mathrm{ERR}\times \mathrm{S1}}\times \mathrm{S2}\div \mathrm{S3}=\frac{10^6\times \mathrm{S1}\div \mathrm{S3}}{\mathrm{ERR'}}\times \mathrm{S2}$ | 1 × S2 ÷ S3 = 1 | $10^6$ × S1 ÷ S3 |

The S3 is adjusted after taking the value of the S1 and S2, and the calculating times of 1 compensatory cycle is accordingly adjusted.

For instance, as Table 6 shown, S1=1, S2=16, S3=16. According to the parameter S2, the compensatory circuits are subjected 1 subtraction every 16 T. The function of the S3 is: set the initial value of the minued of the cyclic subtraction to be $10^6$×S1÷S3. S3=16, the initial value of the minued of the cycle subtraction is set to be $10^6$×1÷16=62500 of which calculating times of one compensatory calculating cycle are 16 times less than the calculating times of the initial value of the minued set to be $10^6$. That is, the minued, the initial value of the minued of the cyclic subtraction is minimized by 16 times, the initial value, the subtrahend ERR of the cyclic subtraction is kept the same, accordingly, the quotient, the calculating times of one compensatory cycle is minimized by 16 times. While one compensatory calculating cycle is closed, $$\frac{62500}{ERR}\times 16T$$

have been passed, and 1 T is compensated.

The benefit of the S3 which can be adjusted is: to reduce the minued and the calculating numbers of the subtractor for diminishing the area of the circuits of compensatory calculation and saving the manufacturing cost. The taking range of the value of the S3 to be: the factors which is divisible by $10^6$×S1 and 1×S2. For instance, S1=1, S2=16, the value of the S3 can be 16. Because $10^6$*1/16=15625 and 1*16/16=1 both conform to the divisibility rule, the S3 which is the factor of $10^6$×1 and 1×16, the value of the S3 can also be 2, 4 and 8.

To sum up, because 1×S2÷S3 periods are needed to be compensated after passing $$\frac{10^6\times S1}{ERR\times S1}\times S2\div S3$$

periods, and 1×S2÷S3 periods cannot be completely compensated within 1 second, the 1 second will become too long or short to be accepted. As a result, S4 periodic numbers can be compensated at most in 1 second. Consequently, finishing compensating W (1×S2÷S3) periodic numbers takes W/S4 seconds, as shown in Table 7.

| Table 7, the interpretations on the parameter S4: | |
|---|---|
| S4 | the maximum compensatory errors |
| 8 | $\frac{8}{32768} = 244.140625$ ppm |
| taking range of the value to be: 1, 2, 3, . . . 32768 | $\frac{S4}{32768}$ |

The S4 is defined as the periodic numbers of reference frequency of the maximum compensation in 1 second, and the maximum compensatory errors is $$\frac{S4}{32786}.$$

For example, as shown in Table 7, S4=8, 8 reference frequency periods can be compensated at most in 1 second, accordingly, the maximum compensatory errors are 8 reference frequency periods, which are compensated in every second. The relative compensatory value is $$\frac{8}{32786} = 244.140625PPM,$$

wherein the taking range of the value of the S4 to be: 1, 2, 3, . . . and 32768.

Applied Examples

Set the parameters to be S1=1000, S2=32768, S3=512, S4=16.

| Table 8 shows the relationship of N and W: | |
|---|---|
| N | W |
| $\frac{10^6 \times 1000}{\text{ERR} \times 1000} \times 32768 \div 512 = \frac{10^9 \div 512}{\text{ERR}'} \times 32768 = \frac{1953125}{\text{ERR}'} \times 32768$ | $1 \times 32768 \div 512 = 64$ |

In accordance with Table 8, the frequency dividing counter CNT is compensated 64 periodic numbers after passing $$\frac{1953125}{ERR'} \times 32768$$

periods. The operating frequency of compensatory circuits is 32768 times of the reference frequency periods (32768 T), which means 1 second. The initial value of the minued of the cyclic subtraction is set to be $10^9 \div 512 = 1953125$. S4=16, which means 16 periodic numbers can be compensated at most in 1 second.

Consulting Table 8, ERR'=ERR*1000, the unit of ERR is 1 PPM, the unit of ERR' is 0.001 PPM which means Parts Per Billion, and the compensatory accuracy is 0.001 PPM.

Figure 4:
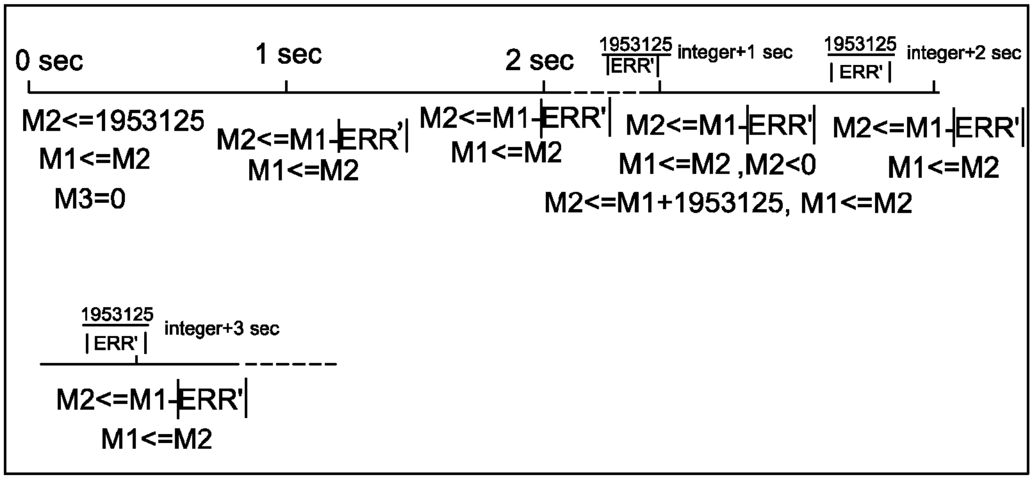
FIG. 4 is a schematic view showing an order of calculating accumulative errors.

As shown in FIG. 4, the schematic view showing the calculating order of the accumulative errors, after passing $$\frac{1953125}{ERR'} \times 32768$$

reference frequency periods, the accumulative errors are accumulated to 64 reference frequency periodic numbers. 1 second represents 32768 reference frequency periods, so $$\frac{1953125}{ERR'}$$

seconds represent the accumulative errors are accumulated to 64 reference frequency periodic numbers, and the errors are recorded.

Wherein, the M1 and the M2 are two registers with 24 digits. The initial value is assigned as 1953125 at 0 second, and one subtraction operation is executed at 1 second, 2 seconds, and N seconds. The difference of the 1 second subtraction is seen as the minued, and the minued is used to subtract the absolute value of ERR'. Until the second to be $$\frac{1953125}{|ERR'|} \text{integer} + 1,$$

and M2<0, the accumulative errors are accumulated to 64 reference frequency periodic numbers after passing $$\frac{1953125}{ERR'} \times 32768$$

reference frequency periods, and the register M3 start to add or subtract 64 to record the periodic numbers of the accumulative errors. The positive and negative signs of ERR' represent the positive and negative errors of the crystal oscillating frequency. When the crystal oscillating frequency is smaller, ERR' is defined as the positive sign, while the crystal oscillating frequency is bigger, ERR' is defined as the negative sign.

$$\frac{1953125}{ERR'}$$

is probably indivisible, and M2 is the negative number. The errors generated from $$\frac{1953125}{ERR'}$$

and M2 will be eliminated in the following cycles. In the next start of every cycle, the initial value of the M2 is set to be M1+1593125.

Figure 5:
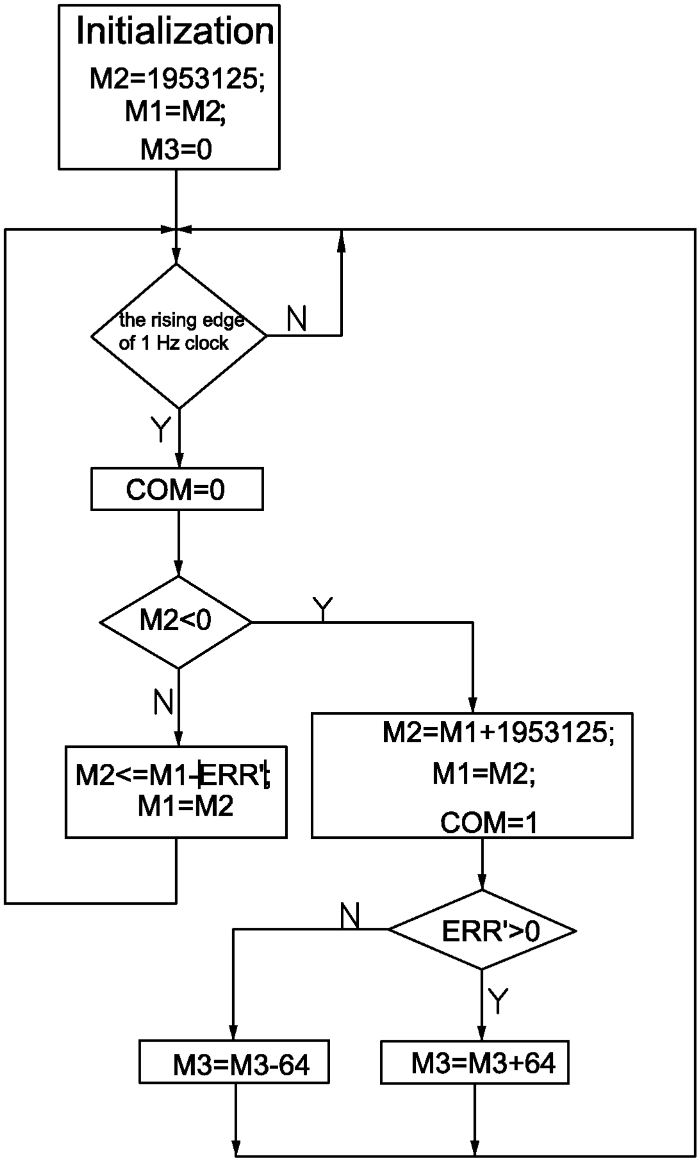
FIG. 5 is a schematic view showing the order of calculating accumulative errors in execution.

As shown in FIG. 5, the schematic view showing the calculating order of the accumulative errors in operation, wherein the COM is the register with 1 digit, which is a compensating flag register. The COM is a high speed TTL (HTTL) and adds 64 to or subtracts 64 from the register M3 when the accumulative errors accumulate to 64 periodic numbers. After 64 is added to or taken from the register M3, the assignment of the register COM is reset to be 0. The frequency of the operated synchronic clocks of the registers M1 and M2 is 1 Hz, which means 32768 reference frequency periods.

FIG. 5 shows the conversion of how many periodic numbers of reference frequency equal to the reference frequency errors ERR', whose unit is 0.001 ppm, and the accumulative errors. The main execution of the above conversion is to set the initial value of the M1 and M2 to be 1953126, subjects one subtraction operation to the data stored in the registers M1 and M2 every second, subtracts the absolute value of ERR' and sets the assignment of COM to be 0. Judges the difference of the last 1 second subtraction every 1 second, if the difference is larger than or equal to 0, the current 1 second continues subtracting the absolute value of ERR' one time; if the difference are smaller than 0, the accumulative errors accumulates to 64 periods, sets the initial value of M2 to be 02<=1953125+M1, M1<=M2, COM=1, and simultaneously adds 64 to or subtracts 64 from the register M3. If ERR'>0, M3<=M3+64; if ERR'<0, M3<=M3-64.

Figure 6:
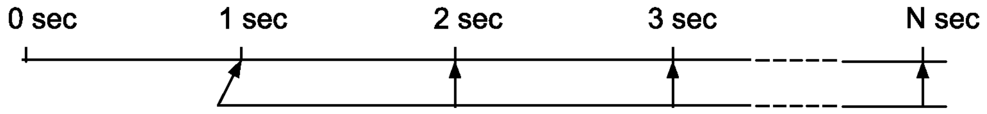
FIG. 6 is a schematic view showing a method for compensating errors.

As FIG. 6 shown, the schematic view of the method for compensating errors, the register M3 is a register storing periodic numbers of the accumulative errors. If M3>0, the crystal oscillating frequency becomes small, and the clock slows down. While CTN=0, the compensation is to set the assignment of CNT to be 16 for fasting the clock by 16 reference frequency periods, and M3=M3-16 records the 16 periods which have been compensated. If M3<0, the crystal oscillating frequency becomes big, and the clock goes fast. While CNT=16, the compensation is to reset the assignment of CNT to be 0 for slowing the clock by 16 reference frequency periods, and M3=M3+16 records 16 periods which has been compensated.

Figure 7:
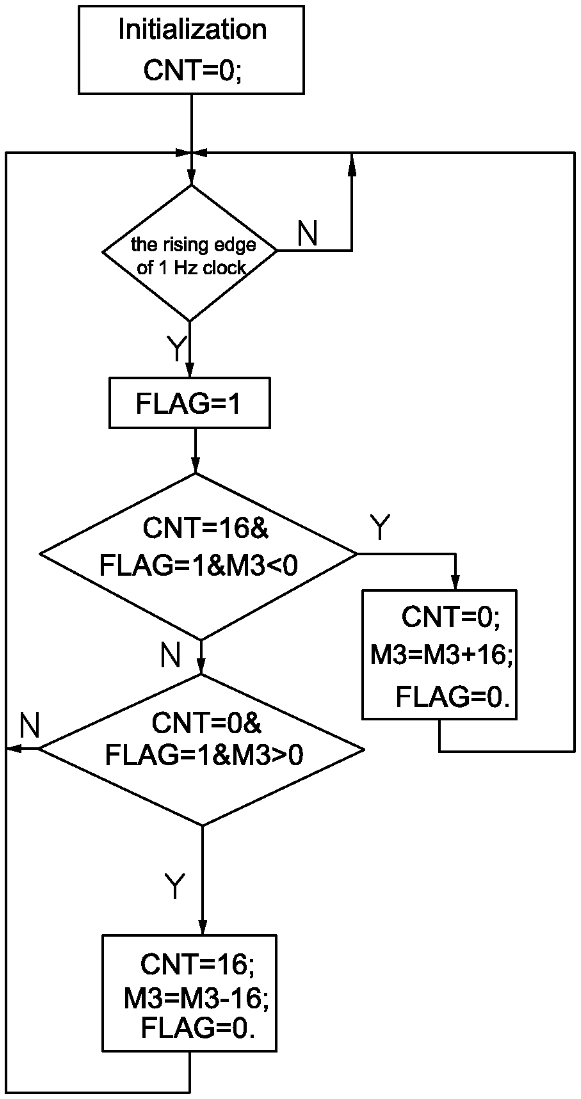
FIG. 7 is a schematic view showing an order of the method for compensating errors in execution.

FIG. 7 shows a schematic view revealing the executing order of the method for compensating errors, wherein the M3 is the register to store the periodic numbers of accumulative errors, the reference frequency of the CNT, which is 32.768 KHz, is divided as the lowest five digits of the counter of which the frequency is 1 Hz. The counter has 15 digits, the error compensation is conducted to decode the lowest five digits of the counter. Accordingly, the area needed to be decoded is diminished, and the power dissipation is simultaneously decreased. The FLAG is the flag register for keeping the maximum compensatory times to be 1 in every 1 second.

The time unit of "second" is compensated in accordance with the reference frequency periodic numbers of accumulative errors M3. The compensation is conducted to interfere the counter CNT. To be more specific, while the rising edge of the 1 Hz clock is arrived, sets the flag register FLAG to be 1. Judges M3 and CNT, if M3<0, CNT=16 and FLAG=1, resets the most highest digit of the counter CNT to be 0, that is to say, counter subtracts 16, and reset the FLAG to be 0; if M3>0, CNT=1, and FLAG=1, the most highest digit of counter CNT is set to be 1, namely, the counter adds 16, and the FLAG is reset to be 0. The flag register FLAG is set to be 1 in the rising edge of the 1 Hz clock, and is reset to be 0 after the compensation for compensating one time at most in 1 second.

What is claimed is:

1. A method for compensating timing errors of real-time clocks which is characterized in that said method comprising a calculating step and a compensating step:

wherein said calculating step comprising:

step 1, subjecting a cyclic subtraction register M2 to an assignment operation, a cyclic subtraction register M1=said cyclic subtraction register $$M2 = \frac{10^6 * S1 * S2}{S3};$$

a periodic number of accumulative errors register M3 being assigned to be 0, wherein said S1 is used to adjust an ERR effective value, said S2 is used to adjust an operating frequency of compensatory circuits, and said S3 is used to adjust a calculation of times, then executing step 2;

step 2, making a compensatory flag register COM assigned to be 0 when a rising edge of a $$\frac{32768}{S2}$$

Hz clock is arrived, said M2 being executed by a subtraction, M2=M1−|ERR*S1|, M1=M2, then executing step 3;

step 3, judging said M2, if M2<0, an assignment to M2 being executed, $$M2 = M1 + \frac{10^6 * S1 * S2}{S3},$$

M1=M2, and said compensatory flag register COM being assigned to be 1, then executing step 4; otherwise, executing said step 2; and step 4, judging ERR*S1, if ERR*S1>0, executing $$M3 = M3 + \frac{S2}{S3};$$

otherwise, executing $$M3 = M3 - \frac{S2}{S3}$$

and executing said step 2; and wherein said compensating step comprising:

step 1, making a frequency dividing counter CNT assigned to be 0, then executing step 2;

step 2, making a compensatory flag register FLAG assigned to be 1 when a rising edge of a 1 Hz clock is arrived, then executing step 3;

step 3, judging said FLAG and said M3, if FLAG=1 and M3<0, executing step 4 while waiting until CNT=S4; if FLAG=1, CNT=0, and M3>0, executing step 5; otherwise, executing said step 2;

step 4, executing an assignment operation, CNT=0, M3=M3+S4, FLAG=0, and restarting said step 2, wherein said S4 is a maximum compensatory periodic number in 1 second; and step 5, executing an assignment operation, CNT=S4, M3=M3−S4, FLAG=0, and restarting said step two.

* * * * *